United States Patent
Kitagawa et al.

(10) Patent No.: US 8,977,200 B2
(45) Date of Patent: Mar. 10, 2015

(54) COMMUNICATION DEVICE PERFORMING MEDIUM DETECTION BY NEAR FIELD COMMUNICATION, EXTERNAL DEVICE, AND EXTERNAL MEDIUM COMMUNICATION SYSTEM

(75) Inventors: Daisaku Kitagawa, Osaka (JP); Kouichi Ishino, Fukuoka (JP); Takeshi Nakayama, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 147 days.

(21) Appl. No.: 13/809,976

(22) PCT Filed: Aug. 23, 2012

(86) PCT No.: PCT/JP2012/005288
§ 371 (c)(1),
(2), (4) Date: Jan. 14, 2013

(87) PCT Pub. No.: WO2013/073081
PCT Pub. Date: May 23, 2013

(65) Prior Publication Data
US 2013/0149963 A1    Jun. 13, 2013

(30) Foreign Application Priority Data

Nov. 14, 2011    (JP) ................. 2011-248902

(51) Int. Cl.
*H04B 5/00*    (2006.01)
*H04B 1/38*    (2006.01)
*H02J 7/00*    (2006.01)

(52) U.S. Cl.
CPC ............ *H04B 5/0093* (2013.01); *H04B 5/0087* (2013.01)
USPC ........................... 455/41.1; 455/557; 320/108

(58) Field of Classification Search
CPC combination set(s) only.
See application file for complete search history.

(56) References Cited

U.S. PATENT DOCUMENTS

| | | | | |
|---|---|---|---|---|
| 5,850,135 A | * | 12/1998 | Kuki et al. | 320/108 |
| 2001/0017957 A1 | * | 8/2001 | Horino et al. | 385/16 |
| 2001/0029167 A1 | * | 10/2001 | Takeda et al. | 455/41 |
| 2002/0182898 A1 | * | 12/2002 | Takahashi et al. | 439/39 |
| 2009/0065582 A1 | * | 3/2009 | Kon et al. | 235/439 |
| 2011/0127844 A1 | * | 6/2011 | Walley et al. | 307/104 |

FOREIGN PATENT DOCUMENTS

| | | |
|---|---|---|
| JP | 63-156538 | 10/1988 |
| JP | 3-230291 | 10/1991 |
| JP | 2000-57277 | 2/2000 |
| JP | 2001-243432 | 9/2001 |

OTHER PUBLICATIONS

"Information technology—Telecommunications and information exchange between systems—Near Field Communication—Interface and Protocol (NFCIP-1)", International Standard, ISO/IEC 18092, First Edition, Apr. 1, 2004, pp. 1-58.
International Search Report issued Oct. 2, 2012 in International (PCT) Application No. PCT/JP2012/005288 (in the English language).

* cited by examiner

*Primary Examiner* — Andrew Wendell
*Assistant Examiner* — Cindy Trandai
(74) *Attorney, Agent, or Firm* — Wenderoth, Lind & Ponack, L.L.P.

(57) ABSTRACT

In an external medium communication system including a non-contact card 300, which is an external medium, and a card communication device 400, which is a communication device, the non-contact card 300 includes a conductive unit 320, and the card communication device 400 includes a detection antenna unit 420 including a detection output antenna 421 and a detection input antenna 422. When the external medium 300 is mounted in a predetermined position, the card communication device 400 detects that the non-contact card 300 is in the predetermined position by detecting that the detection output antenna 421 and the detection input antenna 422 are coupled by electromagnetic induction across the conducting unit 320.

13 Claims, 14 Drawing Sheets

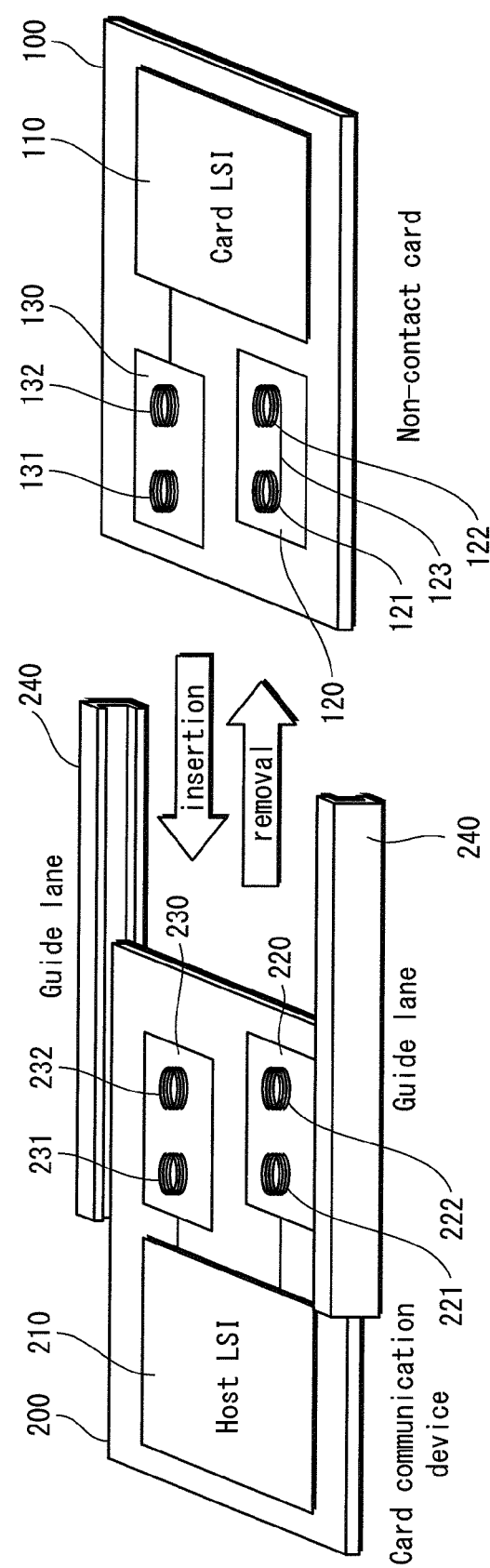

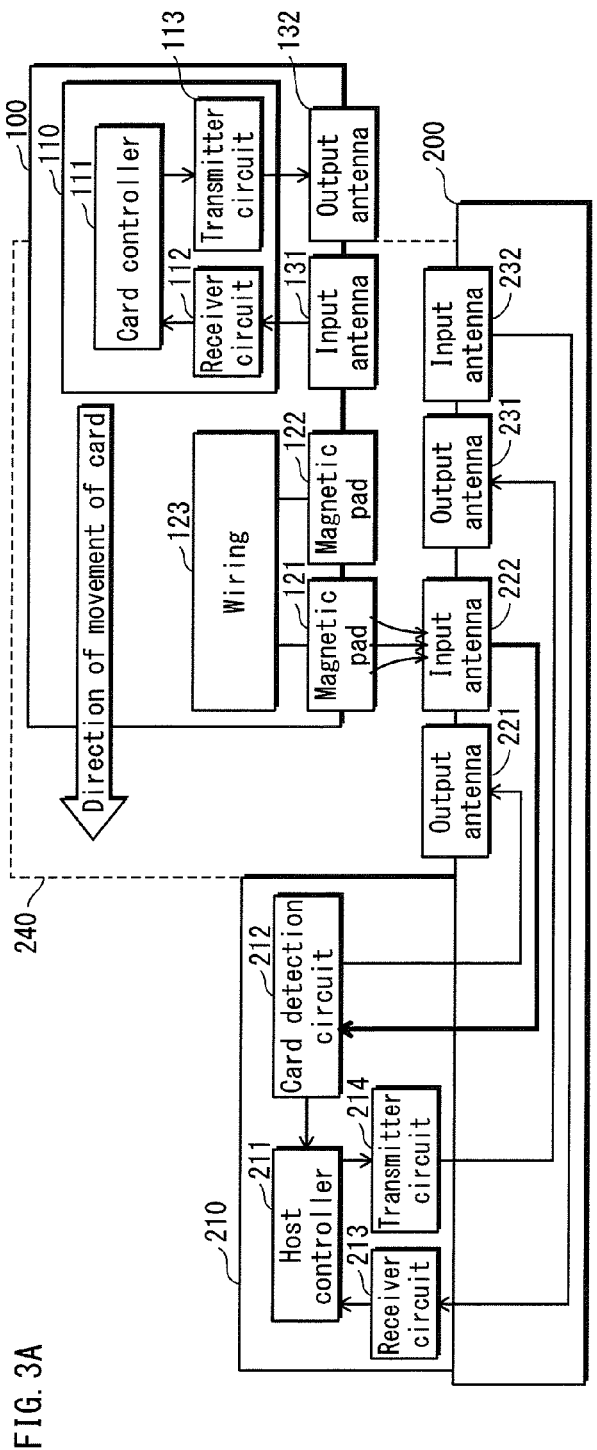
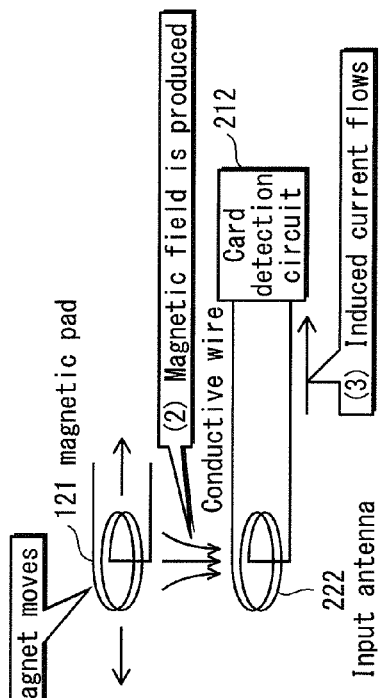
FIG. 3A
FIG. 3B

COMMUNICATION DEVICE PERFORMING MEDIUM DETECTION BY NEAR FIELD COMMUNICATION, EXTERNAL DEVICE, AND EXTERNAL MEDIUM COMMUNICATION SYSTEM

TECHNICAL FIELD

The present invention relates to technology for detecting the mounting of an external medium, a representative example of which is a memory card.

BACKGROUND ART

In recent years, many mobile terminals, such as cellular phones, and home information appliances such as BD (Blu-ray Disc) recorders have an interface that can access an external medium, such as a memory card. The capacity and access speed of all external media, including memory cards, have continued to increase, and external media that have attained a transfer rate of 90 MB/s are now commercially available.

An interface that accesses such an external medium typically uses a wired connection, although wireless connection is also used.

One way of detecting an external medium during wireless connection is to use a proximity sensor, such as an infrared sensor (for example, see Patent Literature 1). The non-contact card recognition device in Patent Literature 1 uses an infrared sensor to detect that a non-contact card is in the proximity of the non-contact card recognition device.

CITATION LIST

Patent Literature

[Patent Literature 1]
Japanese Patent Application Publication No. 2000-57277

SUMMARY OF INVENTION

Technical Problem

Regardless of whether the means of contact with the external medium is wired or wireless, however, it is preferable that an external medium communication device reliably be able to determine whether communication with an external medium is possible.

It is an object of the present invention to provide an external medium communication system, including an external medium communication device and an external medium, that allows for determination of whether communication is possible with the external medium and that accurately detects the position of the external medium.

Solution to Problem

An external medium communication system according to the present invention comprises an external medium and a communication device for communicating with the external medium, the external medium including a conducting unit constituted by a first coil, a second coil, and a wiring unit connecting one end of the first coil to one end of the second coil and connecting another end of the first coil to another end of the second coil, the communication device including: an external medium detection antenna unit constituted by a coiled first antenna and a coiled second antenna; a current supply unit configured to supply current to the first antenna; and an external medium detection unit configured to detect that the first antenna and the second antenna are coupled by electromagnetic induction across the conducting unit by detecting an induced electromotive force produced in the second antenna, and the wiring unit and the external medium detection antenna unit being positioned so that when the external medium is mounted in a predetermined position, the first antenna and the first coil face each other, and the second antenna and the second coil face each other.

Advantageous Effects of Invention

With the above structure, the communication device can detect that the external medium has been mounted in a predetermined position, thereby detecting that an object facing the detection antenna unit is the external medium and that the external medium and the communication device can communicate.

BRIEF DESCRIPTION OF DRAWINGS

FIG. 2 illustrates operations for insertion/removal of a non-contact card into/from a card communication device in the external medium communication system according to Embodiment 1 of the present invention.

FIGS. 3A and 3B illustrate operations for detection of insertion of the non-contact card by the card communication device in the external medium communication system according to Embodiment 1 of the present invention.

DESCRIPTION OF EMBODIMENTS

Discovery Leading to the Present Invention

Figure 1:
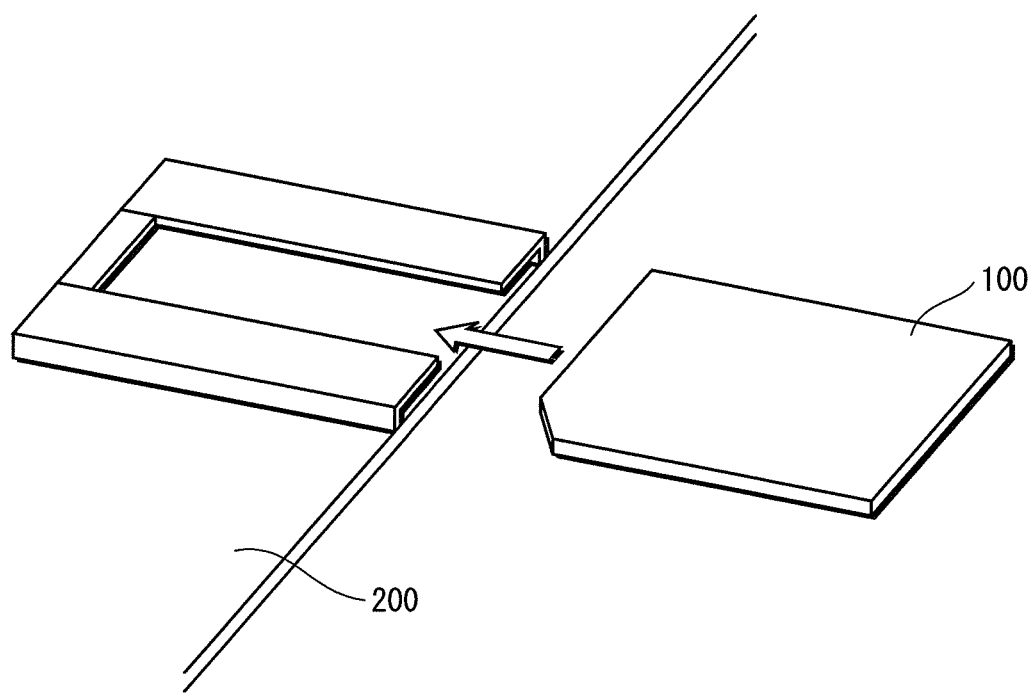
FIG. 1 is a perspective view of an external medium communication system according to Embodiment 1 of the present invention.

It is important for a communication device having an interface that can access an external medium to identify whether communication is possible with the external medium before access. In the case of wireless access, the communication device must first detect the external medium through some method (including notification by the user), or else the communication device might transmit radio waves to a space in which no external medium is present. With the technology in Patent Literature 1, the proximity of an external medium to the communication device is detected with an infrared sensor. The communication device of Patent Literature 1, however, attempts wireless communication by transmitting radio waves to any object detected by the infrared sensor, even if the object is not an external medium, for example even when the object is simply a piece of paper. In other words, with the technology in Patent Literature 1, an external medium cannot be selectively detected before the start of wireless communication.

In the case of wired access as well, it is important to identify whether communication is possible with the external medium before access in order to prevent communication errors due to contact failure or the like. Conventionally, when a means of detecting an external device is required, a detection switch, for example, is provided in the deepest portion of the card slot serving as the interface, and the external medium is detected by the detection switch, by an optical sensor, or the like. Due to a decrease in size of external media, however, the surface area of the external medium that can be used as a contact terminal has grown small, and the tolerance for misalignment during contact has accordingly grown small. Furthermore, an increase in the number of terminals is expected in accordance with an increase in the amount of data transmission resulting from the increased capacity of external media. Thus, the surface area per terminal may decrease even further. A method for detecting an external medium using a detection switch, an optical sensor, or the like cannot detect whether the external medium is misaligned. Therefore, even if the external medium is misaligned leading to a contact failure, it may be mistakenly detected that communication is possible with the external medium. This leads to the problem that the communication device may attempt to access an external device through an interface in which contact failure has occurred, thereby possibly causing communication errors, a short between contact points, or other such trouble.

To address this problem, the inventors conceived of detecting a medium by magnetic coupling using coils. Since an object that is not an external medium (such as a dummy card) does not have coils for magnetic coupling, such an object is not detected by the communication device, thereby preventing improper recognition of such an object as an external medium. The tolerance for misalignment of coils for magnetic coupling is generally smaller than the diameter of the coils. Therefore, detecting an external medium by whether magnetic coupling is achieved using coils having a diameter of approximately the tolerance for misalignment allows for precise detection of the position of an external medium and allows for control such that communication does not start when no external medium is detected due to misalignment that is greater than the tolerance for misalignment. Furthermore, the following two advantageous effects are achieved by a structure in which an external medium and the communication device form two sets of magnetic couplings, and in which two coils are directly coupled in the external medium, with the signal received through one of the magnetic couplings being transmitted as is to the other magnetic coupling. First, the accuracy of position detection increases, since the position of the external medium can be detected in two locations. Second, the external medium requires no constituent element for controlling magnetic couplings; rather, it suffices to provide the external medium with two coupled coils, thereby simplifying the structure of the external medium.

Embodiments

The following describes embodiments of the present invention with reference to the figures.

Embodiment 1

Structure

FIG. 1 illustrates an overview of an external medium communication system according to Embodiment 1 of the present invention.

As illustrated in FIG. 1, the external medium communication system according to Embodiment 1 includes a non-contact card 100 and a card communication device 200. The non-contact card 100 is an external medium that exchanges data by communication with the card communication device 200, which is a communication device, upon being inserted into the predetermined position of a card slot in the card communication device 200. As described below, the card communication device 200 detects that the non-contact card 100 has been inserted in the card slot and begins operations to detect whether the non-contact card 100 is in the predetermined position. After detecting that the non-contact card 100 is in the predetermined position, the card communication device 200 communicates with the non-contact card 100 by near field communication using magnetic coupling via antennas in the shape of a coil. The card communication device 200 terminates communication with the non-contact card 100 upon detecting that the non-contact card 100 is no longer in the predetermined position, thus terminating operations to detect whether the non-contact card 100 is in the predetermined position.

FIG. 2 illustrates operations for insertion/removal of the non-contact card 100 into/from the card communication device 200 in the external medium communication system of Embodiment 1.

The non-contact card 100 is, for example, a memory card and includes a magnet/wiring unit 120, a communication antenna unit 130, and a card LSI unit 110.

The magnet/wiring unit 120 is composed of wiring 123, a magnetic pad 121, and a magnetic pad 122.

The magnetic pads 121 and 122 are permanent magnets in the shape of coils with a diameter of approximately 1 mm formed by winding and magnetizing a conductive ferromagnetic material, representative examples of which include iron oxide and cobalt. The magnetic pads 121 and 122 are positioned so that when the non-contact card 100 and the card communication device 200 are in a positional relationship that allows for communication, the magnetic pad 121 faces a detection output antenna 221, and the magnetic pad 122 faces a detection input antenna 222.

The wiring 123 is composed of conductive wires formed from a conductor such as copper. The wiring 123 connects one end of the coil in the magnetic pad 121 with one end of the coil in the magnetic pad 122 and connects the other end of the coil in the magnetic pad 121 with the other end of the coil in the magnetic pad 122. The magnet/wiring unit 120 thus forms a closed circuit, so that when an induced electromotive force occurs in the magnetic pad 121, current circulates through the magnet/wiring unit 120, producing a magnetic field in the magnetic pad 122 due to electromagnetic induction.

The communication antenna unit 130 includes a card input antenna 131 and a card output antenna 132. As described below, the non-contact card 100 uses the card input antenna 131 and the card output antenna 132 to perform near field communication with the card communication device 200 by magnetic coupling.

The card input antenna 131 and the card output antenna 132 are antennas in the shape of a coil with a diameter of approximately 1 mm and are positioned so that when the non-contact card 100 and the card communication device 200 are in the above-described positional relationship, the card input antenna 131 faces a host output antenna 231, and the card output antenna 132 faces a host input antenna 232. By magnetic coupling with the host output antenna 231, the card input antenna 131 receives a signal from the card communication device 200 and outputs the signal to a card LSI 110. By magnetic coupling with the host input antenna 232, the card output antenna 132 receives a signal from the card LSI 110 and transmits the signal to the card communication device 200. Details on these operations are provided below.

The card LSI 110 includes a card controller 111, a card receiver circuit 112, and a card transmitter circuit 113.

The card receiver circuit 112 converts the signal received by the card input antenna 131 from the card communication device 200 into a data signal and outputs the data signal to the card controller 111.

The card transmitter circuit 113 converts the data signal from the card controller 111 into a signal for transmission to the card communication device 200 and outputs the signal to the card output antenna 132.

The card controller 111 outputs data to the card transmitter circuit 113 in accordance with the data signal from the card receiver circuit 112. For example, if the data signal from the card receiver circuit 112 indicates an operation to read a memory provided in the non-contact card 100 (not shown in the figures), the card controller 111 outputs a data signal that includes data read from the memory (not shown in the figures) to the card transmitter circuit 113.

The card communication device 200 is a device that communicates with the non-contact card 100 and is, for example, a memory card reader/writer. The card communication device 200 includes a host LSI 210, a detection antenna unit 220, a communication antenna unit 230, and guide lanes 240.

The host LSI 210 includes a host controller 211, a host receiver circuit 213, a host transmitter circuit 214, and a card detection circuit 212.

The host receiver circuit 213 converts the signal received by the communication antenna unit 230 from the non-contact card 100 into a data signal and outputs the data signal to the host controller 211.

The host transmitter circuit 214 converts the data signal from the host controller 211 into the signal for transmission to the non-contact card 100 and outputs the signal to the communication antenna unit 230.

The host controller 211 performs operations, in accordance with programs stored therein, for data signal exchange between the host receiver circuit 213 and the host transmitter circuit 214. For example, if the program is for reading from the memory of the non-contact card 100, the host controller 211 outputs a data signal indicating a read operation to the host transmitter circuit 214 and waits for input, from the host receiver circuit 213, of a data signal that includes the content stored in the memory of the non-contact card 100.

The card detection circuit 212 analyzes the signal from the detection antenna unit 220 and notifies the host controller 211 of whether the non-contact card 100 has been partially inserted in the card slot of the card communication device 200. When detecting that the non-contact card 100 has been partially inserted in the card slot of the card communication device 200, then until detecting that the non-contact card 100 has been removed, the card detection circuit 212 outputs a signal to the detection antenna unit 220 and analyzes the signal from the detection antenna unit 220, notifying the host controller 211 of whether the non-contact card 100 is in the predetermined position. The signal that the card detection circuit 212 outputs to this detection antenna unit 220 is, for example, a pulse current.

The host controller 211 controls communication in response to input from the card detection circuit 212. For example, in order to reduce power consumption, the host controller 211 performs control so that no data signal is output to the host transmitter circuit 214 and to ignore data signals from the host receiver circuit 213 until input is received from the card detection circuit 212.

The detection antenna unit 220 includes the detection output antenna 221 and the detection input antenna 222.

The detection output antenna 221 is an antenna in the shape of a coil with a diameter of approximately 1 mm and transmits the signal received from the card detection circuit 212 to the non-contact card 100.

The detection input antenna 222 is an antenna in the shape of a coil with a diameter of approximately 1 mm and outputs, to the card detection circuit 212, the induced current signal produced by the magnet/wiring unit 120 passing by or facing the detection input antenna 222, as described below.

The communication antenna unit 230 includes the host output antenna 231 and the host input antenna 232.

The host output antenna 231 is an antenna in the shape of a coil with a diameter of approximately 1 mm and transmits the signal input from the host transmitter circuit 214 to the non-contact card 100 by magnetic coupling with the card input antenna 131.

The host input antenna 232 is an antenna in the shape of a coil with a diameter of approximately 1 mm and outputs the signal received from the non-contact card 100 to the host receiver circuit 213.

The guide lanes 240 guide the non-contact card 100 to the predetermined position for communication with the card communication device 200. For example, the guide lanes 240 are the card slot in an SD card reader.

As illustrated in FIG. 2, when inserted into or removed from the card communication device 200, the non-contact card 100 moves along the guide lanes 240. Therefore, the magnet/wiring unit 120 in the non-contact card 100 passes over the detection antenna unit 220 in the card communication device 200. Furthermore, when the non-contact card 100 is in the predetermined position for communication with the card communication device 200, the communication antenna unit 130 in the non-contact card 100 and the communication antenna unit 230 in the card communication device 200 face each other.

Operations

The following describes processing when the card communication device 200 detects the non-contact card 100 and either starts or terminates communication in two cases: when the non-contact card 100 is inserted into the card communication device 200, and when the non-contact card 100 is removed from the card communication device 200.

Figure 6:
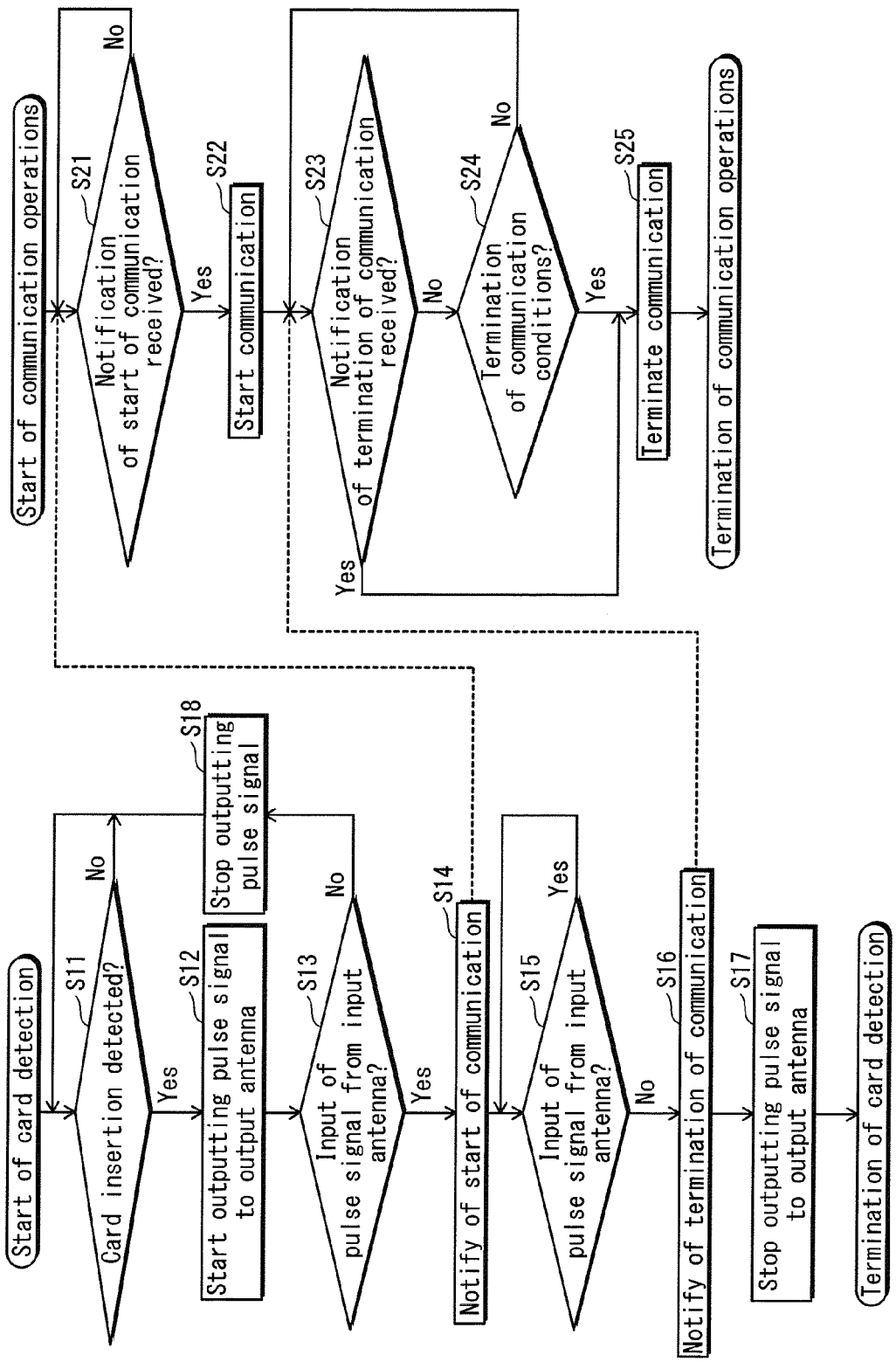
FIG. 6 is a flowchart illustrating operations of the card communication device in the external medium communication system according to Embodiment 1 of the present invention.

Card detection operations by the card detection circuit 212 are shown on the left side of FIG. 6, whereas communication operations by the host controller 211 are shown on the right side of FIG. 6.

First, the case of when the non-contact card 100 is inserted into the card communication device 200 is described.

FIGS. 3A and 3B show the non-contact card 100 partway through insertion into the card communication device 200. As illustrated in FIGS. 3A and 3B, as the non-contact card 100 is inserted into the card communication device 200, the magnetic pad 121 passes over the detection input antenna 222 in the card communication device 200, since the direction of movement of the non-contact card 100 is determined by the guide lanes 240. At this point, as illustrated in FIG. 3B, the magnetic pad 121, which is a magnet, passes over the detection input antenna 222, which is a conductive wire in the shape of a coil. Therefore, the magnetic field produced by the magnetic pad 121 passes through the detection input antenna 222, and by the principal of electromagnetic induction, the induced current produced in the detection input antenna 222 flows into the card detection circuit 212.

Figure 4:
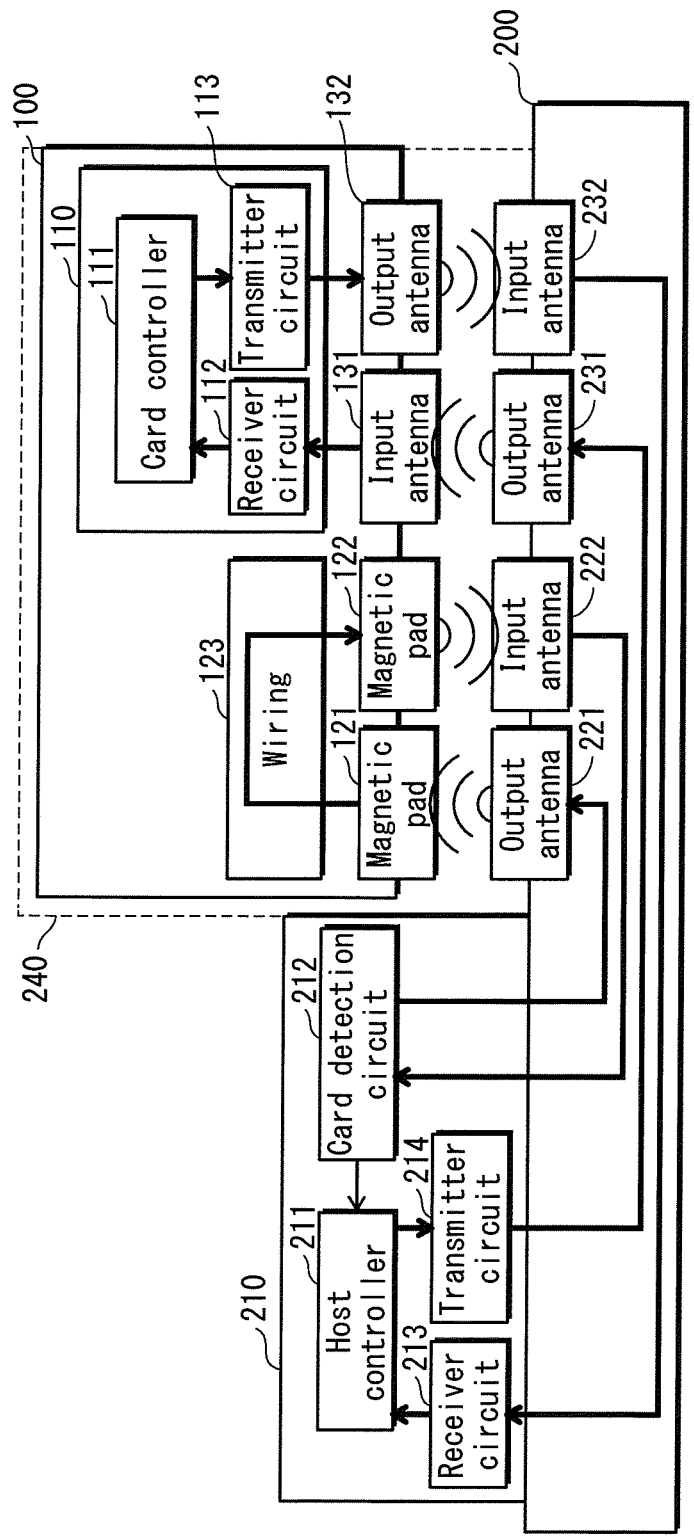
FIG. 4 illustrates the non-contact card at a predetermined position in the external medium communication system according to Embodiment 1 of the present invention.
Figure 5A:
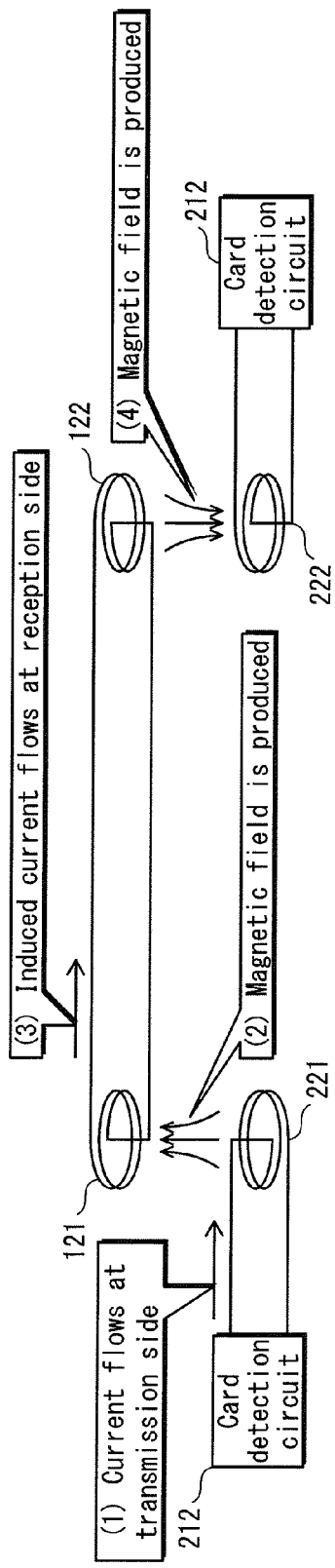
FIGS. 5A and 5B illustrate antenna operations of the non-contact card and the card communication device in the external medium communication system according to Embodiment 1 of the present invention.

FIG. 4 illustrates the non-contact card 100 in the predetermined position of the card communication device 200 in the external medium communication system of Embodiment 1. As illustrated in FIG. 5A, upon detecting the flow of induced current from the detection input antenna 222 (S11), the card detection circuit 212 determines that the non-contact card 100 has been partially inserted into the card communication device 200 and outputs a pulse signal having a first pattern to the detection output antenna 221 (S12). By electromagnetic induction, the detection output antenna 221 generates a magnetic field. At this point, if the non-contact card 100 is in a position at which communication with the card communication device 200 is possible, then the magnetic pad 121 in the non-contact card 100 is located above the detection output antenna 221, and an electromotive force is generated in the magnetic pad 121 due to the magnetic field generated by the detection output antenna 221. Since the magnetic pad 121 forms a closed circuit with the wiring 123 and the magnetic pad 122, as described above, current yielded by the electromotive force generated in the magnetic pad 121 flows into the magnetic pad 122. This current becomes a pulse signal having a second pattern. The second pattern has a smaller amplitude (the maximum absolute value of the current) than the first pattern, with the rising edge and the falling edge being less sharply distinct than the first pattern. The magnetic pad 122 generates a magnetic field by electromagnetic induction. In the detection input antenna 222 located below the magnetic pad 122, an induced electromotive force occurs due to the magnetic field generated by the magnetic pad 122. Current caused by the induced electromotive force generated in the detection input antenna 222 flows into the card detection circuit 212. This current becomes a pulse signal having a third pattern. The third pattern has a smaller amplitude (the maximum absolute value of the current) than the second pattern, with the rising edge and the falling edge being less sharply distinct than the third pattern.

As a result, upon transmitting current to the detection output antenna 221, the card detection circuit 212 detects current from the detection input antenna 222 caused by the transmitted current, and a portion of the power transmitted by the card detection circuit 212 returns to the card detection circuit 212 via the non-contact card 100. If the waveform of the current from the detection input antenna 222 corresponds to the waveform of the current transmitted to the detection output antenna 221, the card detection circuit 212 confirms loop-back of power (S13: Yes) and notifies the host controller 211 that the non-contact card 100 is in the predetermined position, i.e. that the non-contact card 100 and the card communication device 200 are in a positional relationship in which communication is possible (S14).

Despite the card detection circuit 212 having determined that the non-contact card 100 has started to be inserted in the card communication device 200 and having provided current to the detection output antenna 221, if no induced current flows back from the detection input antenna 222, the card detection circuit 212 performs retry processing to provide current a predetermined number of times to the detection output antenna 221. If no current flows back from the detection input antenna 222 despite the retry processing, the card detection circuit 212 determines that the non-contact card 100 has been removed after partial insertion and then waits again for current from the detection input antenna 222 produced by card insertion. At this point, the card detection circuit 212 does not provide the host controller 211 with any notification (S18).

Figure 5B:
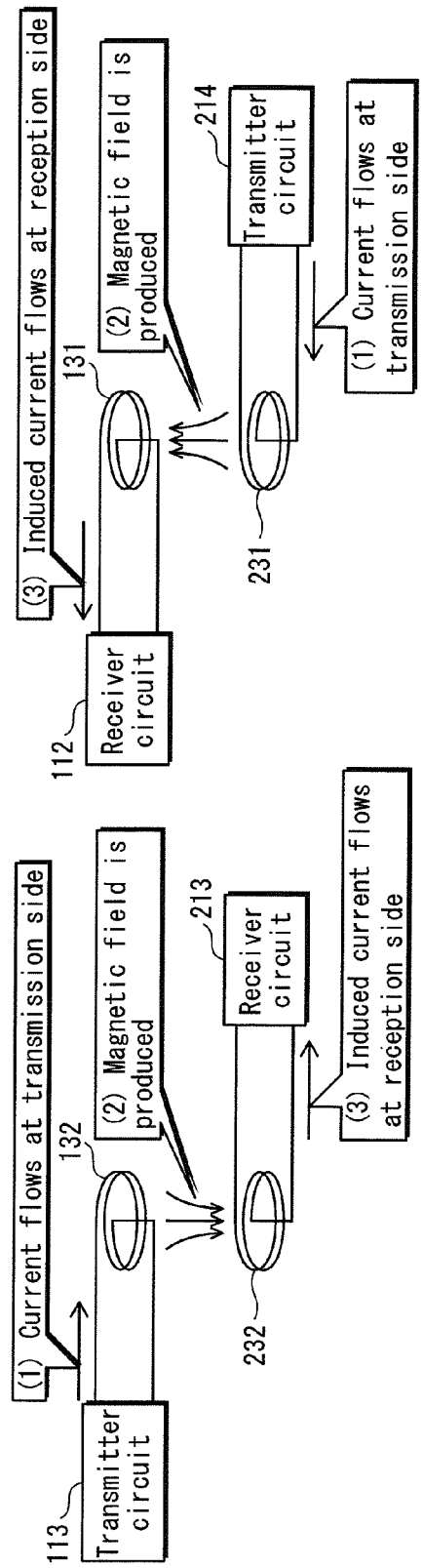

Having received notification of detection of the non-contact card 100 from the card detection circuit 212 (S21: Yes), the host controller 211 starts communication with the non-contact card 100 (S22). The host controller 211 outputs the data signal to the host transmitter circuit 214. The host transmitter circuit 214 converts the data signal into current and provides the current to the host output antenna 231. As illustrated in FIG. 5B, the host output antenna 231 generates a magnetic field by electromagnetic induction. The card input antenna 131 in the non-contact card 100 located above the host output antenna 231 provides induced current to the card receiver circuit 112 via the magnetic field generated by the host output antenna 231. The card receiver circuit 112 converts the induced current into a data signal and outputs the data signal to the card controller 111. The card controller 111 analyzes the data signal from the card receiver circuit 112 and outputs a corresponding data signal to the card transmitter circuit 112. The card transmitter circuit 112 converts the data signal into current and outputs the current to the card output antenna 132. The card output antenna 132 generates a magnetic field by electromagnetic induction. The host input antenna 232 in the card communication device 200 located below the card output antenna 132 provides induced current to the host receiver circuit 213 via the magnetic field generated by the card output antenna 132. The host receiver circuit 213 converts the induced current into a data signal and outputs the data signal to the host controller 211.

The card detection circuit 212 continually provides current to the detection output antenna 221 and continually monitors whether induced current arrives from the detection input antenna 222, i.e. whether the loop-back is maintained through the non-contact card 100 (S15).

Next, the case of when the non-contact card 100 is removed from the card communication device 200 is described.

Figure 7:
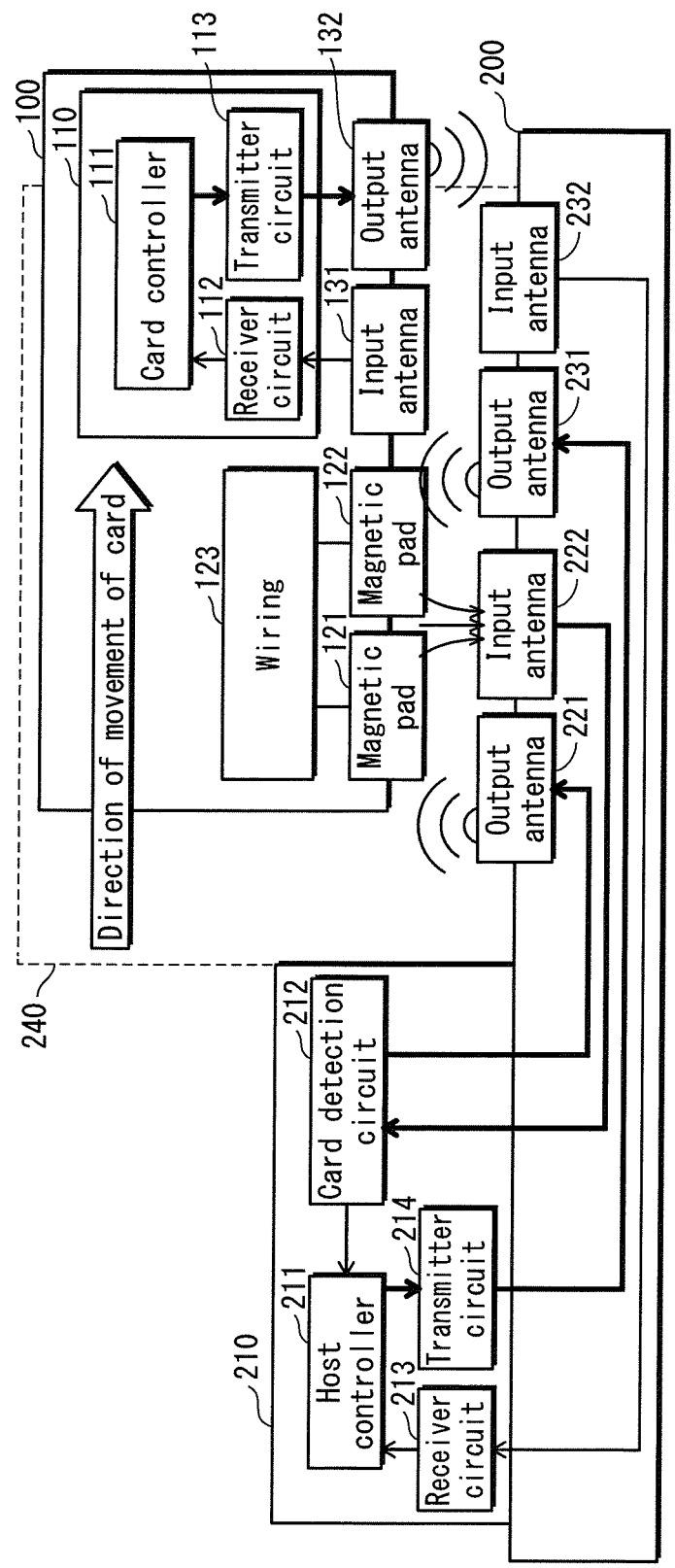
FIG. 7 illustrates operations for removal of the non-contact card from the card communication device in the external medium communication system according to Embodiment 1 of the present invention.

As illustrated in FIG. 7, when the non-contact card 100 is removed from the card communication device 200, the magnetic pad 121 and the magnetic pad 122 in the non-contact card 100 respectively stop facing the detection output antenna 221 and the detection input antenna 222 in the card communication device 200, resulting in cutoff of the loop-back whereby the power transmitted as current to the detection output antenna 221 by the card detection circuit 212 in the non-contact card 100 returns as induced current from the detection input antenna 222. At this point, the card detection circuit 212 determines that removal of the non-contact card 100 from the card communication device 200 has started (S15: No).

When the non-contact card 100 is further removed from the card communication device 200, the magnetic pad 121 in the non-contact card 100 passes over the detection input antenna 222 in the card communication device 200, since the direction of movement of the non-contact card 100 is determined by the guide lanes 240. At this point, the card detection circuit 212 detects the induced current generated in the detection input antenna 222 by electromagnetic induction.

When the non-contact card 100 is even further removed from the card communication device 200, the magnetic pad 121 in the non-contact card 100 moves past the detection input antenna 222 in the card communication device 200, and therefore induced current stops flowing from the detection input antenna 222 to the card detection circuit 212. At this point, the card detection circuit 212 determines that the non-contact card 100 has been removed from the card communication device 200 and notifies the host controller 211 (S16).

After determining that the non-contact card 100 has started to be removed from the card communication device 200, the card detection circuit 212 determines that the non-contact card 100 has been reinserted after being partially removed when current from the detection input antenna 222 continues to flow, and in this case the card detection circuit 212 does not provide the host controller 211 with notification (S15: No).

Having received notification from the card detection circuit 212, the host controller 211 terminates communication with the non-contact card 100 (S25). Note that when communication within non-contact card 100 has already terminated, the host controller 211 does nothing (S24: Yes).

The card detection circuit 212 stops providing current to the detection output antenna 221 and then waits for induced current to flow from the detection input antenna 222, i.e. for the non-contact card 100 to be inserted in the card communication device 200 (S17).

This structure performs near field communication by magnetic coupling using low-cost materials and does not require processing for communication before detection of an external medium. Therefore, the structure achieves a low-cost, low-power external medium communication system that can detect an external medium without contact.

Furthermore, with near field communication, communication is not possible between two antennas that face each other if the antennas are misaligned by more than approximately the diameter thereof (in the present embodiment, approximately 1 mm). When magnetic coupling is not achieved between the communication antennas, the card detection circuit 212 does not detect the power loop-back, thus allowing for accurate detection of whether communication is possible between the non-contact card 100 and the card communication device 200.

Moreover, near field communication using electromagnetic induction as in the present embodiment can propagate a current of 1 GHz or more if the communication distance is approximately 1 mm to 3 mm, thereby allowing for communication at a high access rate.

Embodiment 2

Structure

Figure 8:
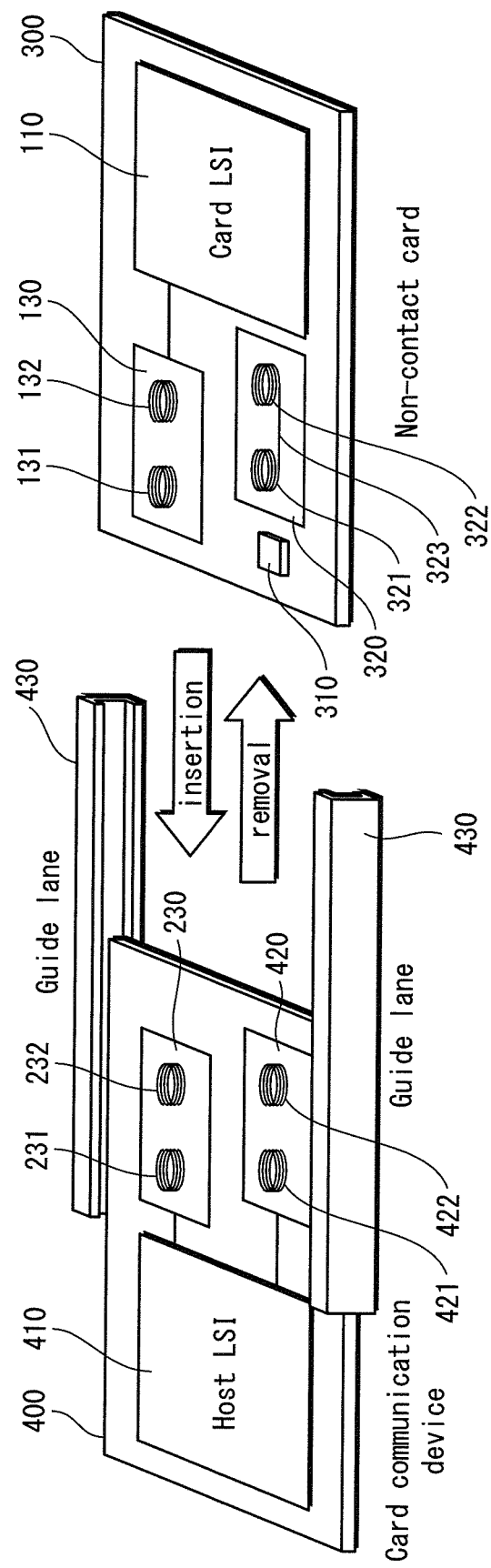
FIG. 8 illustrates operations for insertion/removal of a non-contact card into/from a card communication device in an external medium communication system according to Embodiment 2 of the present invention.
Figure 9:
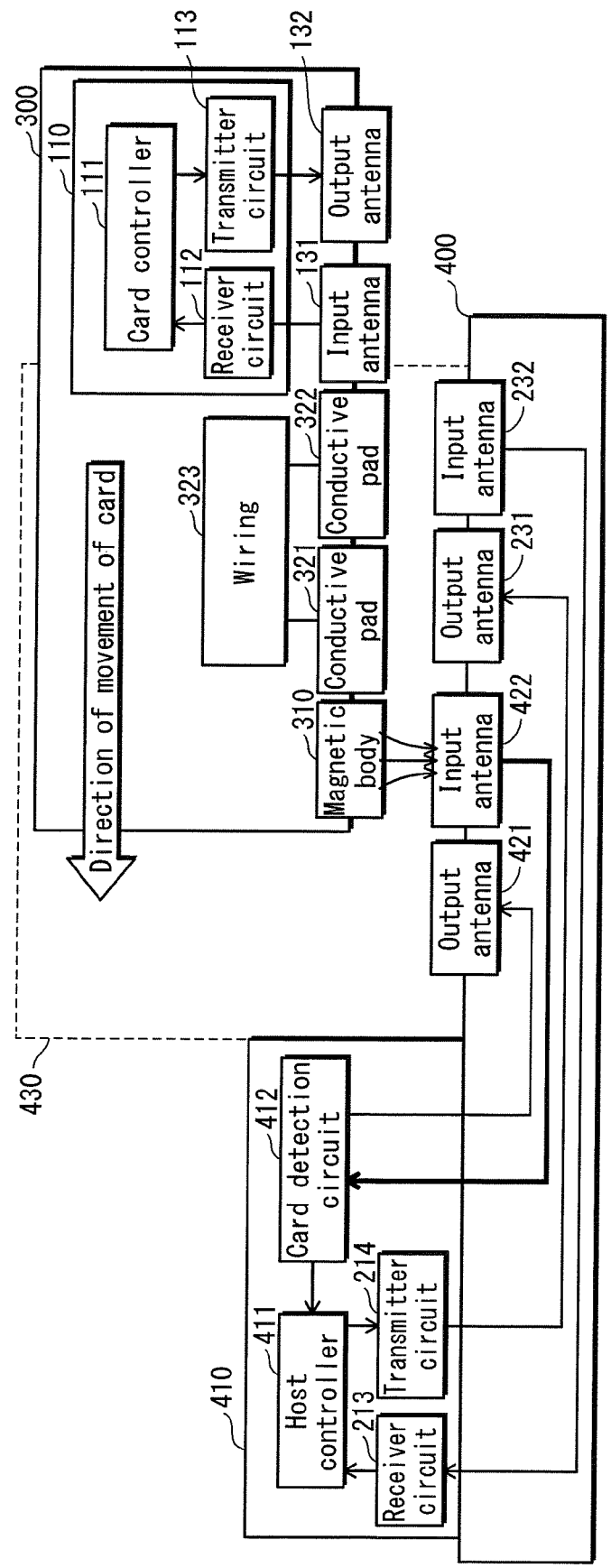
FIG. 9 illustrates operations for detection of insertion of the non-contact card by the card communication device in the external medium communication system according to Embodiment 2 of the present invention.

FIG. 8 illustrates an external medium communication system according to Embodiment 2 of the present invention, and FIG. 9 shows a non-contact card 300 partway through insertion into a card communication device 400 of the external medium communication system according to Embodiment 2. In FIGS. 8 and 9, the same reference signs are used for constituent elements that are the same as in FIGS. 2 and 3A, and a description thereof is omitted.

As illustrated in FIG. 8, the external medium communication system according to Embodiment 2 includes the non-contact card 300 and the card communication device 400. The non-contact card 300 is characteristically provided with a magnetic body 310 and a wiring unit 320, and the card communication device 400 is characteristically provided with a host LSI 410, a detection antenna unit 420, and guide lanes 430.

The non-contact card 300 is, for example, an external medium such as a memory card and includes the magnetic body 310, the wiring unit 320, the communication antenna unit 130, and the card LSI unit 110.

The magnetic body 310 is a permanent magnet made of a ferromagnetic material, representative examples of which are iron oxide, cobalt, and ferrite. The magnetic body 310 is positioned so that as the non-contact card 300 is inserted into and removed from the card communication device 400, the magnetic body 310 passes near a detection input antenna 422.

The wiring unit 320 is composed of wiring 323, a conductive pad 321, and a conductive pad 322.

The conductive pads 321 and 322 are, for example, coils approximately 1 mm in diameter formed by winding a conductor such as copper. The conductive pads 321 and 322 are positioned so that when the non-contact card 300 and the card communication device 400 are in a positional relationship that allows for communication, the conductive pad 321 faces a detection output antenna 421, and the conductive pad 322 faces the detection input antenna 422.

The wiring 323 is composed of conductive wires formed from a conductor such as copper. The wiring 323 connects one end of the coil in the conductive pad 321 with one end of the coil in the conductive pad 322 and connects the other end of the coil in the conductive pad 321 with the other end of the coil in the conductive pad 322. The wiring unit 320 thus forms a closed circuit, so that when an induced electromotive force occurs in the conductive pad 321, current circulates through the wiring unit 320, producing a magnetic field in the conductive pad 322 due to electromagnetic induction.

The card communication device 400 includes the host LSI 410, the detection antenna unit 420, the communication antenna unit 230, and the guide lanes 430.

The host LSI 410 is a device that communicates with the non-contact card 300 and is, for example, a memory card reader/writer. The host LSI 410 includes a host controller 411, the host receiver circuit 213, the host transmitter circuit 214, and a card detection circuit 412.

The host controller 411 performs operations, in accordance with programs stored therein, for data signal exchange between the host receiver circuit 213 and the host transmitter circuit 214. For example, if the program is for reading from the memory of the non-contact card 300, the host controller 411 outputs a data signal indicating a read operation to the host transmitter circuit 214 and waits for input, from the host receiver circuit 213, of a data signal that includes the content stored in the memory of the non-contact card 300.

The card detection circuit 412 analyzes the signal from the detection antenna unit 420 and notifies the host controller 411 of whether the non-contact card 300 has been partially inserted in the card slot in the card communication device 400. When detecting that the non-contact card 300 has been partially inserted in the card slot of the card communication device 400, then until detecting that the non-contact card 300 has been removed, the card detection circuit 412 outputs a signal to the detection antenna unit 420 and analyzes the signal from the detection antenna unit 420, notifying the host controller 411 of whether the non-contact card 300 is in the predetermined position. The signal that the card detection circuit 412 outputs to this detection antenna unit 420 is, for example, a pulse current.

The host controller 411 controls communication in response to input from the card detection circuit 412. For example, in order to reduce power consumption, the host controller 411 performs control so that no data signal is output to the host transmitter circuit 214 and to ignore data signals from the host receiver circuit 213 until input is received from the card detection circuit 412.

The detection antenna unit 420 includes the detection output antenna 421 and the detection input antenna 422.

The detection output antenna 421 is an antenna in the shape of a coil with a diameter of approximately 1 mm and transmits the signal received from the card detection circuit 412 to the non-contact card 300.

The detection input antenna 422 is an antenna in the shape of a coil with a diameter of approximately 1 mm and outputs wireless data received from the non-contact card 300 to the card detection circuit 412.

The guide lanes 430 guide the non-contact card 300 to the predetermined position for communication with the card communication device 400. For example, the guide lanes 430 are the card slot in an SD card reader.

As illustrated in FIG. 9, when inserted into or removed from the card communication device 400, the non-contact card 300 moves along the guide lanes 430. Therefore, the magnetic body 310 and the wiring unit 320 in the non-contact card 300 pass over the detection antenna unit 420 in the card communication device 400. In a state in which communication is possible, the communication antenna unit 130 in the non-contact card 300 and the communication antenna unit 230 in the card communication device 400 face each other.

Operations

The following describes processing when the card communication device 400 detects the non-contact card 300 and either starts or terminates communication in two cases: when the non-contact card 300 is inserted into the card communication device 400, and when the non-contact card 300 is removed from the card communication device 400.

First, the case of when the non-contact card 300 is inserted into the card communication device 400 is described.

As illustrated in FIG. 9, as the non-contact card 300 is inserted into the card communication device 400, the magnetic body 310 in the non-contact card 300 passes over the detection input antenna 422 in the card communication device 400, since the direction of movement is determined by the guide lanes 430 in the card communication device 400. At this point, the magnetic field produced by the magnetic body 310 passes through the detection input antenna 422, and induced current generated in the detection input antenna 422 flows to the card detection circuit 412.

Figure 11:
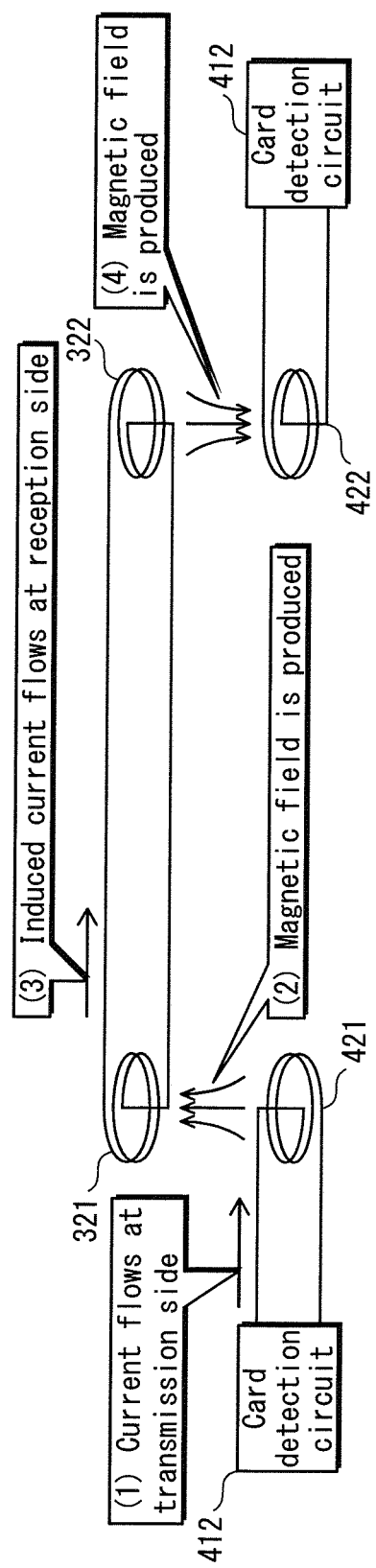
FIG. 11 illustrates antenna operations of the non-contact card and the card communication device in the external medium communication system according to Embodiment 2 of the present invention.

As illustrated in FIG. 11, the card detection circuit 412 into which the induced current from the detection input antenna 422 has flowed determines that the non-contact card 300 has started to be inserted in the card communication device 400 and outputs a pulse signal to the detection output antenna 421. By electromagnetic induction, the detection output antenna 421 generates a magnetic field. At this point, if the non-contact card 300 is in a position at which communication with the card communication device 400 is possible, then the conductive pad 321 in the non-contact card 300 is located above the detection output antenna 421, and an induced electromotive force is generated in the conductive pad 321 due to the magnetic field generated by the detection output antenna 421. Since the conductive pad 321 forms a closed circuit with the wiring 323 and the conductive pad 322, as described above, current yielded by the electromotive force generated in the conductive pad 321 flows into the conductive pad 322. The conductive pad 322 generates a magnetic field by electromagnetic induction. In the detection input antenna 422 located below the conductive pad 322, an induced electromotive force occurs due to the magnetic field generated by the conductive pad 322. Current caused by the induced electromotive force generated in the detection input antenna 422 flows into the card detection circuit 412. Details have been provided in Embodiment 1 and therefore are omitted here.

As a result, upon transmitting current to the detection output antenna 421, the card detection circuit 412 detects current from the detection input antenna 422 caused by the transmitted current, and a portion of the power transmitted by the card detection circuit 412 returns to the card detection circuit 412 via the non-contact card 300. If the waveform of the current from the detection input antenna 422 corresponds to the waveform of the current transmitted to the detection output antenna 421, the card detection circuit 412 confirms loop-back of power and notifies the host controller 411 that the non-contact card 300 is in the predetermined position, i.e. that the non-contact card 300 and the card communication device 400 are in a positional relationship in which communication is possible.

Despite the card detection circuit 412 having determined that the non-contact card 300 has started to be inserted in the card communication device 400 and having provided current to the detection output antenna 421, if no induced current flows back from the detection input antenna 422, the card detection circuit 412 performs retry processing to provide current a predetermined number of times to the detection output antenna 421. If no current flows back from the detection input antenna 422 despite the retry processing, the card detection circuit 412 determines that the non-contact card 300 has been removed after partial insertion and then waits again for current from the detection input antenna 422 produced by the magnetic body 310 passing by. At this point, the card detection circuit 412 does not provide the host controller 411 with any notification.

Figure 10:
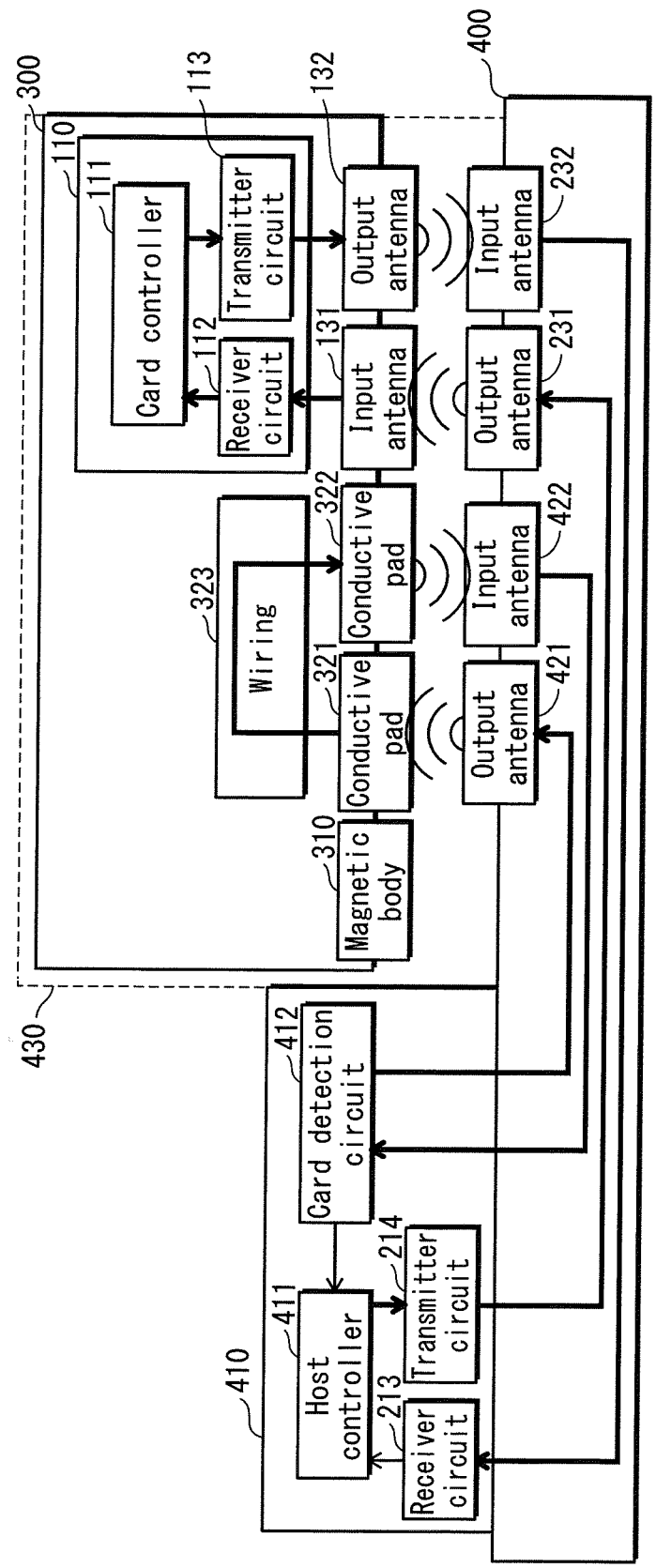
FIG. 10 illustrates the non-contact card at a predetermined position in the external medium communication system according to Embodiment 2 of the present invention.

As illustrated in FIG. 10, having received notification of detection of the non-contact card 300 from the card detection circuit 412, the host controller 411 starts communication with the non-contact card 300. Since operations during communication between the non-contact card 300 and the card communication device 400 are the same as operations during communication between the non-contact card 100 and the card communication device 200 according to Embodiment 1, a description thereof is omitted.

The card detection circuit 412 continually provides current to the detection output antenna 421 and continually monitors whether induced current arrives from the detection input antenna 422, i.e. whether the loop-back is maintained through the non-contact card 300.

Next, the case of when the non-contact card 300 is removed from the card communication device 400 is described.

When the non-contact card 300 is removed from the card communication device 400, the conductive pad 321 and the conductive pad 322 in the non-contact card 300 respectively stop facing the detection output antenna 421 and the detection input antenna 422 in the card communication device 400, resulting in cutoff of the loop-back whereby the power transmitted as current to the detection output antenna 421 by the card detection circuit 412 in the non-contact card 300 returns as induced current from the detection input antenna 422. At this point, the card detection circuit 412 determines that removal of the non-contact card 300 from the card communication device 400 has started.

When the non-contact card 300 is further removed from the card communication device 400, the magnetic body 310 in the non-contact card 300 passes over the detection input antenna 422 in the card communication device 400, since the direction of movement is determined by the guide lanes 430 in the card communication device 400. At this point, a magnetic field is produced by electromagnetic induction in the detection input antenna 422, and induced current flows into the card detection circuit 412 in the card communication device 400.

Figure 12:
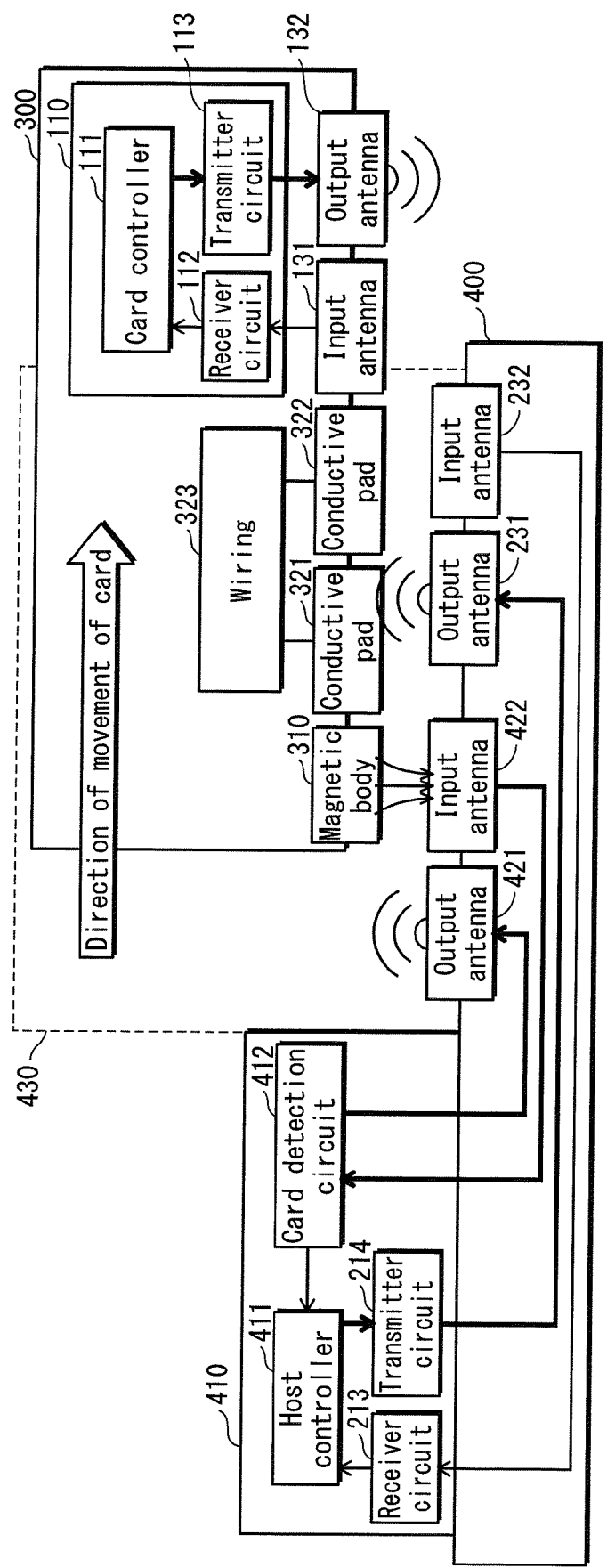
FIG. 12 illustrates operations for removal of the non-contact card from the card communication device in the external medium communication system according to Embodiment 2 of the present invention.

As illustrated in FIG. 12, when the non-contact card 300 is even further removed from the card communication device 400, the conductive pad 321 in the non-contact card 300 moves past the detection input antenna 422 in the card communication device 400, and therefore induced current stops flowing from the detection input antenna 422 to the card detection circuit 412. At this point, the card detection circuit 412 determines that the non-contact card 300 has been removed from the card communication device 400 and notifies the host controller 411. After determining that the non-contact card 300 has started to be removed from the card communication device 400, the card detection circuit 412 determines that the non-contact card 300 has been reinserted after being partially removed when current from the detection input antenna 422 continues to flow, and in this case the card detection circuit 412 does not provide the host controller 411 with notification.

Having received notification from the card detection circuit 412, the host controller 411 terminates communication with the non-contact card 300.

The card detection circuit 412 stops providing current to the detection output antenna 421 and then waits for induced current to flow from the detection input antenna 422, i.e. for the non-contact card 300 to be inserted in the card communication device 400.

In the external medium communication system according to Embodiment 2, the conductive pads are not permanent magnets, making it unnecessary to process conductive ferromagnetic material in order to create coil-shaped permanent magnets. Furthermore, since the magnetic body 310 need not be conductive, the magnetic body 310 may be formed from a nonconductive or semi-conductive material, such as a gum magnet or a plastic magnet. The non-contact card 300 according to Embodiment 2 is simpler to manufacture than the non-contact card 100 according to Embodiment 1.

Embodiment 3

Structure

Figure 13:
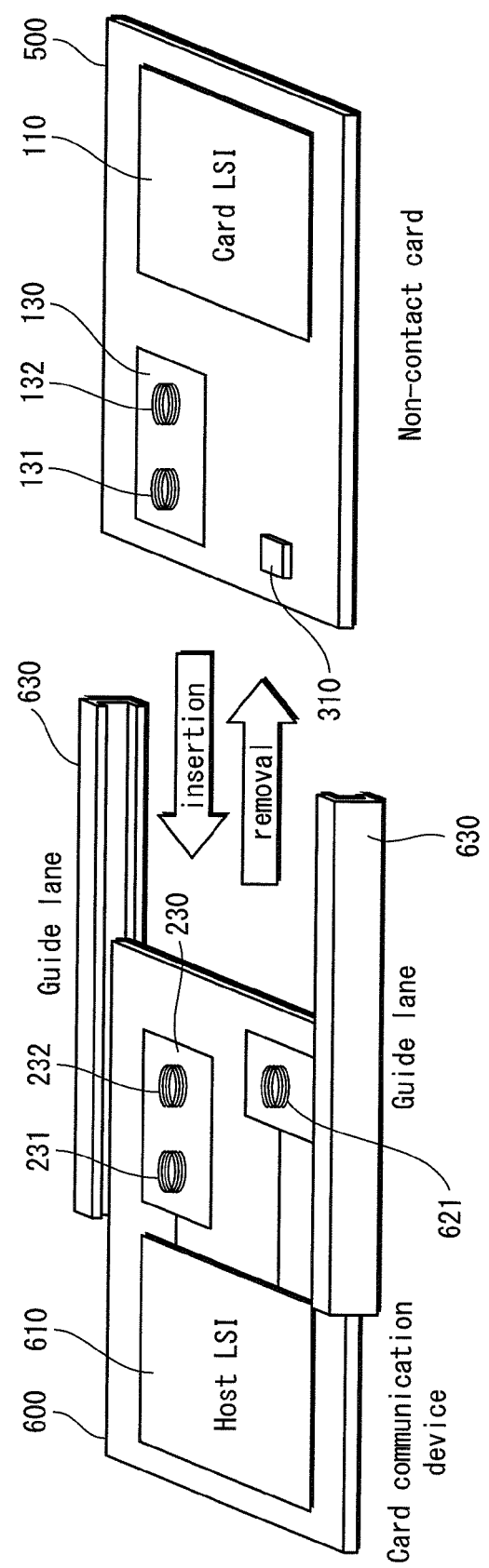
FIG. 13 illustrates operations for insertion/removal of a non-contact card into/from a card communication device in an external medium communication system according to Embodiment 3 of the present invention.
Figure 14:
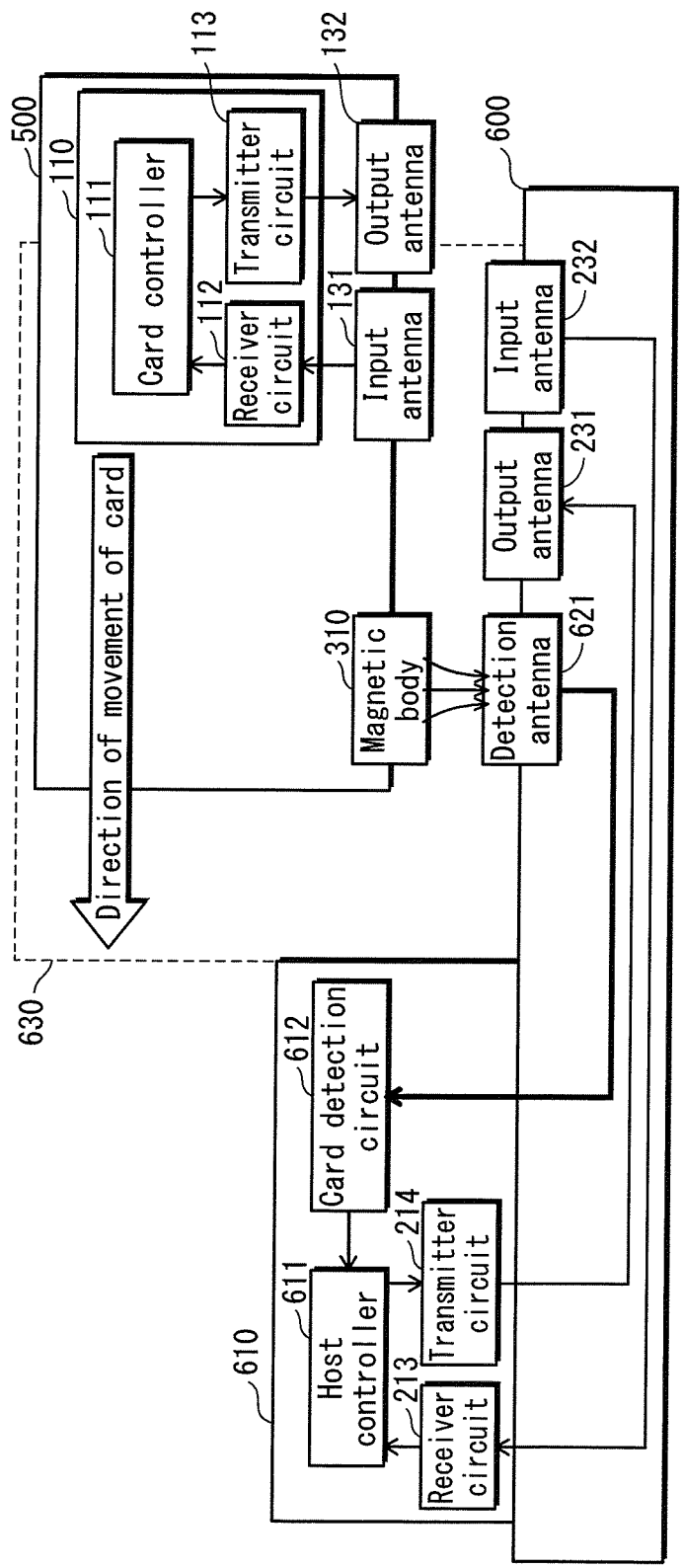
FIG. 14 illustrates operations for detection of insertion of the non-contact card by the card communication device in the external medium communication system according to Embodiment 3 of the present invention.

FIG. 13 illustrates an external medium communication system according to Embodiment 3 of the present invention, and FIG. 14 shows a non-contact card 500 partway through insertion into a card communication device 600 of the external medium communication system according to Embodiment 3. In FIGS. 13 and 14, the same reference signs are used for constituent elements that are the same as in FIGS. 2, 3A, 8, and 9, and a description thereof is omitted.

As illustrated in FIG. 13, the external medium communication system according to Embodiment 3 includes the non-contact card 500 and the card communication device 600. The non-contact card 500 is characterized by including neither the magnet/wiring unit 120 nor the wiring unit 320. The card communication device 600 is a communication device that uses the non-contact card 500 as an external medium.

The non-contact card 500 is, for example, an external medium such as a memory card and includes the magnetic body 310, the communication antenna unit 130, and the card LSI unit 110.

The magnetic body 310 is a permanent magnet made of a ferromagnetic material, representative examples of which are iron oxide, cobalt, and ferrite. The magnetic body 310 is positioned so that as the non-contact card 500 is inserted into and removed from the card communication device 600, the magnetic body 310 passes near a detection antenna 621.

The card communication device 600 is a device that communicates with the non-contact card 500 and is, for example, a memory card reader/writer. The card communication device 600 includes a host LSI 610, a detection antenna 621, the communication antenna unit 230, and guide lanes 630.

The host LSI 610 includes a host controller 611, the host receiver circuit 213, the host transmitter circuit 214, and a card detection circuit 612.

The host controller 611 performs operations, in accordance with programs stored therein, for data signal exchange between the host receiver circuit 213 and the host transmitter circuit 214. For example, if the program is for reading from the memory of the non-contact card 500, the host controller 611 outputs a data signal indicating a read operation to the host transmitter circuit 214 and waits for input, from the host receiver circuit 213, of a data signal that includes the content stored in the memory of the non-contact card 500.

The card detection circuit 612 analyzes the signal from the detection antenna 621 and notifies the host controller 611 of whether the non-contact card 500 has been partially inserted in the card slot of the card communication device 600.

The host controller 611 controls communication in response to input from the card detection circuit 612. For example, in order to reduce power consumption, the host controller 611 performs control so that no data signal is output to the host transmitter circuit 214 and to ignore data signals from the host receiver circuit 213 until input is received from the card detection circuit 612.

The detection antenna 621 is an antenna in the shape of a coil and outputs, to the card detection circuit 612, induced currents generated when the magnetic body 310 passes nearby.

The guide lanes 630 guide the position of the non-contact card 500 when the non-contact card 500 is being inserted into or removed from the card communication device 600, so that the magnetic body 310 passes near the detection antenna 621. For example, the guide lanes 630 are the card slot in an SD card reader.

As illustrated in FIG. 14, when inserted into or removed from the card communication device 600, the non-contact card 500 moves along the guide lanes 630. The magnetic body 310 in the non-contact card 500 therefore passes over the detection antenna 621 in the card communication device 600.

Operations

The following describes processing when the card communication device 600 detects the non-contact card 500 and either starts or terminates communication in two cases: when the non-contact card 500 is inserted into the card communication device 600, and when the non-contact card 500 is removed from the card communication device 600.

First, the case of when the non-contact card 500 is inserted into the card communication device 600 is described.

As illustrated in FIG. 14, as the non-contact card 500 is inserted into the card communication device 600, the magnetic body 310 in the non-contact card 500 passes over the detection antenna 621 in the card communication device 600, since the direction of movement is determined by the guide lanes 630 in the card communication device 600. At this point, the magnetic field produced by the magnetic body 310 passes through the detection antenna 621, and induced current generated in the detection antenna 621 flows to the card detection circuit 612.

As illustrated in FIG. 14, the card detection circuit 612 into which the induced current from the detection antenna 621 has flowed determines that the non-contact card 500 has been inserted in the card communication device 600 and notifies the host controller 611 that insertion of the non-contact card 500 has been detected.

As illustrated in FIG. 14, having received notification that insertion of the non-contact card 500 has been detected from the card detection circuit 612, the host controller 611 starts communication with the non-contact card 500. Since operations during communication between the non-contact card 500 and the card communication device 600 are the same as operations during communication between the non-contact card 100 and the card communication device 200 according to Embodiment 1, a description thereof is omitted.

Next, the case of when the non-contact card 500 is removed from the card communication device 600 is described.

When the non-contact card 500 is removed from the card communication device 600, the magnetic body 310 in the non-contact card 500 passes over the detection antenna 621 in the card communication device 600, since the direction of movement is determined by the guide lanes 630 in the card communication device 600. At this point, the magnetic field produced by the magnetic body 310 passes through the detection antenna 621, and induced current generated in the detection antenna 621 flows to the card detection circuit 612.

The card detection circuit 612 determines that the non-contact card 500 has been removed from the card communication device 600 and notifies the host controller 611.

Having received notification from the card detection circuit 612, the host controller 611 terminates communication with the non-contact card 500.

As there is no loop-back in the external medium communication system according to Embodiment 3, the related constituent elements are unnecessary. Embodiment 3 offers an external medium communication system that can detect an external medium without contact while allowing for simpler production than Embodiment 1 and Embodiment 2.

Other Modifications to the Embodiments (1) Embodiments 1 through 3 describe the card communication device 200, 400, and 600, and the non-contact card 100, 300, and 500 performing near field communication by magnetic coupling with coils, but the present invention is not limited to this case. For example, the card communication device 200 may communicate with a card 100 over a wired connection, and the detection antenna unit 230 and magnet/wiring unit 120 may be positioned so that the card detection circuit 212 can detect the power loop-back when all of the terminals for the wired connection between the card communication device 200 and card 100 are in a positional relationship allowing normal connection. With this structure, the present invention may be adopted when it is necessary to accurately detect the positional relationship between a card communication device and the card regardless of the method of communication used between the card communication device and the card.

(2) In Embodiment 1, the magnetic pads 121 and 122 are coil-shaped magnets made from a conductive ferromagnetic material, but the present invention is not limited to this case. For example, the magnetic pads 121 and 122 may be composed of a conductive coil and a permanent magnet used as the core of the coil. With this structure, it is not necessary to form the magnetic pads from a conductive ferromagnetic material, thereby simplifying the structure of the magnetic pads.

(3) In Embodiment 1, the magnetic pad 122 is a coil-shaped magnet made from a conductive ferromagnetic material, but the present invention is not limited to this case. For example, the conductive pad 322, which is a conductive coil, may be used instead of the magnetic pad 122. This allows for simplification of the structure of the magnet/wiring unit 120.

(4) In Embodiment 1, the non-contact card 100 and the card communication device 200 communicate using the card antenna unit 130 and the host antenna unit 230, but the present invention is not limited to this case. For example, the card communication device 200 may be provided with a transmission unit for supplying power to the host output antenna 231, and the non-contact card 100 may be provided with a power storage unit that receives the power via the card input antenna 131. The non-contact card 100 may then store the power received from the transmission unit of the card communication device 200 in the power storage unit and operate using the power stored in the power storage unit. With this structure, power may be supplied without contact to the non-contact card 100 simply by adding the transmission unit and the power storage unit.

(5) In Embodiment 1 and 2, the input antenna 131 and the output antenna 132 in the card antenna unit 130, the output antenna 231 and the input antenna 232 in the host antenna unit 230, the output antenna 221 and the antenna input antenna 222 in the detection antenna unit 220, the output antenna 421 and the input antenna 422 in the detection antenna unit 420, the magnetic pads 121 and 122, and the conductive pads 321 and 322 are all antennas in the shape of a coil with a diameter of 1 mm, but the present invention is not limited to this case. As long as the four antennas in the shape of a coil included in the non-contact card 100 or 300 are approximately the same size as the four antennas in the shape of a coil that are included in the card communication device 200 or 400 and that face the non-contact card when communication is possible, the coils may all, for example, have a diameter of 500 μm. This structure allows for use of antennas having a size that is appropriate for both the necessary communication rate and the tolerance for misalignment between the non-contact card 100 or 300 and the corresponding card communication device 200 or 400.

(6) In Embodiments 2 and 3, the magnetic body 310 is a permanent magnet made from a conductive ferromagnetic material, representative examples of which include iron oxide and cobalt, but the present invention is not limited to this case. For example, the magnetic body 310 may be a bond magnet such as a plastic magnet or a gum magnet incorporating ferromagnetic material.

(7) In Embodiment 3, the magnetic body 310 passes by a position to the detection antenna 621 while the non-contact card 500 is being inserted into or removed from the card communication device 600, the present invention is not limited to this case. For example, the magnetic body 310 may be positioned so as to face the detection antenna 621 when the non-contact card 500 and the card communication device 600 are in a positional relationship in which communication is possible, and the card detection circuit 612 may also detect induced current when the magnetic body 310 is facing the detection antenna 621. This structure allows the card communication device 600 to detect not only whether the non-contact card 500 is being inserted or removed, but also whether the non-contact card 500 is in a position in which communication is possible.

(8) In Embodiments 1 and 2, the card communication device is provided with one detection antenna unit, and the non-contact card is provided with one magnet/wiring unit, or with one wiring unit and one magnetic body, but the present invention is not limited to this case. For example, a structure may be adopted in which the card communication device is provided with a detection antenna unit G and a detection antenna unit H, a non-contact card P is provided with a wiring unit J facing the detection antenna unit G, a non-contact card Q is provided with a wiring unit K facing the detection antenna unit H, and the card communication device is provided with a medium type identification unit that identifies the type of external medium depending on the detection antenna unit in which power loop-back occurs. Simply by placing the external medium at the predetermined position, this structure allows for identification of a plurality of types of external media having different commands for access and different communication antenna positions, thereby achieving a multi-card reader that supports a plurality of different types of cards.

(9) In Embodiments 1 through 3, the card communication device and the non-contact card are each provided with two antennas in the shape of a coil for performing near field communication by magnetic coupling, thereby performing full-duplex communication, but the present invention is not limited to this case. For example, a structure may be adopted in which the card communication device is provided with a host antenna in the shape of a coil, the non-contact card is provided with a card antenna in the shape of coil, and the card communication device and the non-contact card perform half-duplex communication by magnetic coupling between the host antenna and the card antenna. This structure allows for the number of antennas to be adjusted in accordance with the number of channels necessary for communication between the card communication device and the non-contact card.

Alternatively, the following structure may be adopted. The card communication device is provided with an antenna A, an antenna B, and an antenna C in the shape of a coil for communication, and a non-contact card X is provided with an antenna D and an antenna E in the shape of a coil for communication. When the non-contact card X is in the predetermined position, the antenna A and the antenna D face each other, and the antenna B and the antenna E face each other. A non-contact card Y is provided with an antenna F and an antenna G in the shape of a coil for communication. When the non-contact card Y is in the predetermined position, the antenna A and the antenna F face each other, and the antenna C and the antenna F face each other. The card communication device is provided with an antenna selection unit that selects the antenna for communication based on the position of the antennas in the external medium. In the case of a plurality of types of non-contact cards having antennas in different positions, this structure allows the card communication device to perform access by selectively using antennas in accordance with the type of card.

(10) Embodiments 1 through 3 are merely examples of the present invention, and a variety of improvements or modifications that do not depart from the scope of the present invention may be made.

The following describes the structure and advantageous effects of an external medium communication system, a communication device, and an external medium according to an aspect.

(a) An external medium communication system according to an aspect comprises an external medium and a communication device for communicating with the external medium, the external medium including a conducting unit constituted by a first coil, a second coil, and a wiring unit connecting one end of the first coil to one end of the second coil and connecting another end of the first coil to another end of the second coil, the communication device including: an external medium detection antenna unit constituted by a coiled first antenna and a coiled second antenna; a current supply unit configured to supply current to the first antenna; and an external medium detection unit configured to detect that the first antenna and the second antenna are coupled by electromagnetic induction across the conducting unit by detecting an induced electromotive force produced in the second antenna, and the wiring unit and the external medium detection antenna unit being positioned so that when the external medium is mounted in a predetermined position, the first antenna and the first coil face each other, and the second antenna and the second coil face each other.

With the above structure, it is detected that the first antenna and the second antenna are coupled by electromagnetic induction across the conducting unit by detection of an induced electromotive force produced in the second antenna, thereby allowing for detection that the conducting unit is in the predetermined position. In turn, this allows for detection that the object facing the detection antenna unit is the external medium and that the external medium and the communication device can communicate. Furthermore, in the case of coupling by electromagnetic induction, electromagnetic waves sharply weaken away from a near field having approximately the diameter of the coil, making it impossible for the communication device to detect the external medium if the external medium is misaligned. Therefore, the above structure allows for an external medium communication system that can accurately detect whether the position of the external medium is the predetermined position for communication.

(b) In the external medium communication system according to the aspect in (a), the external medium may further include a permanent magnet positioned so as to pass by a location adjacent to the second antenna while the external medium is being inserted into and removed from the communication device, and the external medium detection unit may further be configured to detect an induced electromotive force produced in the second antenna due to the permanent magnet passing by the location adjacent to the second antenna.

With this structure, the communications device can detect that the external medium is being inserted or removed, thus eliminating the need for operations to detect the position of the external medium when the external medium is not in the predetermined position and reducing power consumption in the communication device.

(c) In the external medium communication system according to the aspect in (a), the conducting unit may be a permanent magnet, and the external medium detection unit may be further configured to detect an induced electromotive force produced in the second antenna due to the conducting unit passing by a location adjacent to the second antenna.

With this structure, the conducting unit and the permanent magnet in the external device are unified. In addition to the advantageous effect achieved in (b), this structure also reduces the size of the external medium.

(d) In the external medium communication system according to the aspect in (b) or (c), the communication device may further include a guide lane configured to guide the external medium so that the permanent magnet passes by the location adjacent to the second antenna while the external medium is inserted into and removed from the communication device.

With this structure, the communication device can secure the external medium in the predetermined position and reliably detect when the external medium is being inserted or removed.

(e) In the external medium communication system according to the aspect in (a), the communication device may further include: a coiled host antenna for communicating with the external medium; and a transmission unit configured to transmit power to the host antenna for supplying power to the external medium. The external medium may further include a medium antenna facing the host antenna when the external medium is mounted in the predetermined position, and via the medium antenna, the external medium may receive the power supplied for operating from the transmission unit by electromagnetic induction.

With this structure, the external medium can receive power for operating from the communication device by near field communication, thereby reducing the size of the external medium.

(f) A communication device according to an aspect is for communicating with an external medium including a conducting unit, comprises: an external medium detection antenna unit constituted by a coiled first antenna and a coiled second antenna that face the conducting unit when the external medium is mounted in a predetermined position; a current supply unit configured to supply current to the first antenna; and an external medium detection unit configured to detect whether the first antenna and the second antenna are coupled by electromagnetic induction across the conducting unit.

This structure achieves a communication device that communicates with an external medium by detecting that the first antenna and the second antenna are coupled by electromagnetic induction across the conducting unit, thereby allowing for detection that the conducting unit is in the predetermined position and for accurate detection of whether the position of the external medium is the predetermined position for communication.

(g) In the communication device according to the aspect in (f), the external medium may include a permanent magnet positioned so as to pass by a location adjacent to the first antenna while the external medium is being inserted into and removed from the communication device, and the external medium detection unit may be further configured to detect an induced electromotive force produced in the second antenna due to the permanent magnet passing by the location adjacent to the first antenna.

With this structure, the communications device can detect that the external medium is being inserted or removed, thus eliminating the need for operations to detect the position of the external medium when the external medium is not in the predetermined position and reducing power consumption in the communication device.

(h) The communication device according to the aspect in (g) may further comprise a guide lane configured to guide the external medium so that the permanent magnet passes by the location adjacent to the first antenna while the external medium is inserted into and removed from the communication device.

With this structure, the communication device can secure the external medium in the predetermined position and reliably detect when the external medium is being inserted or removed.

(j) The communication device according to the aspect in (f) may further comprise a coiled host antenna for communicating with the external medium; and a transmission unit configured to transmit power to the host antenna for supplying power to the external medium.

With this structure, the communication device can transmit power for operating to the external medium by near field communication, thereby reducing the size of the external medium.

(k) An external medium according to an aspect is for communicating with a communication device including an external medium detection unit and a card detection antenna unit including a coiled first antenna and a coiled second antenna, the external medium comprising: a conducting unit constituted by a first coil facing the first antenna, a second coil facing the second antenna, and a wiring unit connecting one end of the first coil to one end of the second coil and connecting another end of the first coil to another end of the second coil, the conducting unit facing the first antenna and the second antenna when the external medium is mounted in a predetermined position.

This structure allows for an external medium that can communicate with a communication device having a detection antenna unit including a first antenna and a second antenna.

(l) The external medium according to the aspect in (k) may further comprise a permanent magnet positioned so as to pass by a location adjacent to the first antenna while the external medium is being inserted and removed.

With this structure, the external medium can cause the communication device to detect the external medium during insertion or removal thereof.

(m) In the external medium according to the aspect in (k), the conducting unit may be a permanent magnet positioned so as to pass by a location adjacent to the first antenna while the external medium is being inserted and removed.

With this structure, the external medium need not be provided with a magnet that is a separate structure from the conducting unit, thereby reducing the size of the external medium.

INDUSTRIAL APPLICABILITY

The external medium communication system according to the present invention, which can detect an external medium without contact, can be implemented at a low cost and is therefore useful in digital appliances that handle SD cards and other general external media, representative examples of which include digital televisions and video recorders. In particular, the external medium communication system according to the present invention is low power and is therefore useful in mobile devices such as digital cameras or smart phones.

REFERENCE SIGNS LIST 100, 300, 500 non-contact card
110 card LSI
111 card controller
112 card receiver circuit
113 card transmitter circuit
120 magnet/wiring unit
121 magnetic pad
122 magnetic pad 123, 323 wiring
130 communication antenna unit
131 card input antenna
132 card output antenna
200, 400, 600 card communication device
210, 410, 610 host LSI
211, 411, 611 host controller
212, 412, 612 card detection circuit
213 host receiver circuit
214 host transmitter circuit
220, 420 detection antenna unit
221, 421 detection output antenna
222, 422 detection input antenna
230 communication antenna unit
231 host output antenna
232 host input antenna
240, 430, 630 guide lanes
310 magnetic body
320 wiring unit
321 conductive pad
322 conductive pad
621 detection antenna

The invention claimed is:

1. An external medium communication system comprising an external medium and a communication device for communicating with the external medium,
the external medium including a conducting unit constituted by a first coil, a second coil, and a wiring unit connecting one end of the first coil to one end of the second coil and connecting another end of the first coil to another end of the second coil,
the communication device including:
an external medium detection antenna unit constituted by a coiled first antenna and a coiled second antenna;
a current supply unit configured to supply current to the first antenna; and
an external medium detection unit configured to detect that the first antenna and the second antenna are coupled by electromagnetic induction across the conducting unit by detecting a first induced electromotive force produced in the second antenna,
the wiring unit and the external medium detection antenna unit being positioned so that when the external medium is mounted in a predetermined position, the first antenna and the first coil face each other, and the second antenna and the second coil face each other,
the external medium further including a permanent magnet positioned so as to pass by a location adjacent to the second antenna while the external medium is being inserted into and removed from the communication device, and
the external medium detection unit further configured to detect a second induced electromotive force produced in the second antenna due to the permanent magnet passing by the location adjacent to the second antenna.

2. The external medium communication system of claim 1, wherein
the communication device further includes a guide lane configured to guide the external medium so that the permanent magnet passes by the location adjacent to the second antenna when the external medium is inserted into and removed from the communication device.

3. The external medium communication system of claim 1, wherein
the communication device further includes:
a coiled host antenna for communicating with the external medium; and
a transmission unit configured to transmit power to the host antenna for supplying power to the external medium,
the external medium further includes a medium antenna facing the host antenna when the external medium is mounted in the predetermined position, and
via the medium antenna, the external medium receives the power supplied for operating from the transmission unit by electromagnetic induction.

4. A communication device for communicating with an external medium including a conducting unit, comprising:
an external medium detection antenna unit constituted by a coiled first antenna and a coiled second antenna that face the conducting unit when the external medium is mounted in a predetermined position;
a current supply unit configured to supply current to the first antenna; and
an external medium detection unit configured to detect whether the first antenna and the second antenna are coupled by electromagnetic induction across the conducting unit,
the external medium including a permanent magnet positioned so as to pass by a location adjacent to the first antenna while the external medium is being inserted into and removed from the communication device, and
the external medium detection unit further configured to detect an induced electromotive force produced in the second antenna due to the permanent magnet passing by the location adjacent to the first antenna.

5. The communication device of claim 4, further comprising
a guide lane configured to guide the external medium so that the permanent magnet passes by the location adjacent to the first antenna while the external medium is inserted into and removed from the communication device.

6. The communication device of claim 4, further comprising
a coiled host antenna for communicating with the external medium; and
a transmission unit configured to transmit power to the host antenna for supplying power to the external medium.

7. An external medium for communicating with a communication device including an external medium detection unit and a card detection antenna unit including a coiled first antenna and a coiled second antenna, the external medium comprising:
a conducting unit constituted by a first coil facing the first antenna, a second coil facing the second antenna, and a wiring unit connecting one end of the first coil to one end of the second coil and connecting another end of the first coil to another end of the second coil, the conducting unit facing the first antenna and the second antenna when the external medium is mounted in a predetermined position, wherein
the conducting unit is a permanent magnet positioned so as to pass by a location adjacent to the first antenna while the external medium is being inserted into and removed from the communication device.

8. An external medium communication system comprising an external medium and a communication device for communicating with the external medium,
the external medium including a conducting unit constituted by a first coil, a second coil, and a wiring unit connecting one end of the first coil to one end of the second coil and connecting another end of the first coil to another end of the second coil, the communication device including:
- an external medium detection antenna unit constituted by a coiled first antenna and a coiled second antenna;
- a current supply unit configured to supply current to the first antenna; and
- an external medium detection unit configured to detect that the first antenna and the second antenna are coupled by electromagnetic induction across the conducting unit by detecting a first induced electromotive force produced in the second antenna,
- the wiring unit and the external medium detection unit being positioned so that when the external medium is mounted in a predetermined position, the first antenna and the first coil face each other, and the second antenna and the second coil face each other,
- the conducting unit being a permanent magnet, and
- the external medium detection unit further configured to detect a second induced electromotive force produced in the second antenna due to the conducting unit passing by a location adjacent to the second antenna.

9. The external medium communication system of claim 8, wherein
- the communication device further includes a guide lane configured to guide the external medium so that the permanent magnet passes by the location adjacent to the second antenna while the external medium is inserted into and removed from the communication device.

10. The external medium communication system of claim 1, wherein
- when the external medium is positioned in a set position, a third induced electromotive force is generated in the first coil by current supplied by the current supply unit flowing in the first antenna, and
- the external medium detection unit detects the first induced electromotive force produced by current flowing in the second coil due to the third induced electromotive force.

11. The external medium communication system of claim 1, wherein
- the current supply unit supplies the current to the first antenna when the external medium detection unit detects the second induced electromotive force, and stops supplying the current to the first antenna once the external medium detection unit no longer detects the first induced electromotive force.

12. The external medium communication system of claim 8, wherein
- when the external medium is positioned in a set position, a third induced electromotive force is generated in the first coil by current supplied by the current supply unit flowing in the first antenna, and
- the external medium detection unit detects the first induced electromotive force produced by current flowing in the second coil due to the third induced electromotive force.

13. The external medium communication system of claim 8, wherein
- the current supply unit supplies the current to the first antenna when the external medium detection unit detects the second induced electromotive force, and stops supplying the current to the first antenna once the external medium detection unit no longer detects the first induced electromotive force.

* * * * *